(12) United States Patent
Bae et al.

(10) Patent No.: US 9,219,264 B2
(45) Date of Patent: Dec. 22, 2015

(54) SEPARATOR FOR RECHARGEABLE LITHIUM BATTERY AND RECHARGEABLE LITHIUM BATTERY INCLUDING THE SAME

(71) Applicant: SAMSUNG SDI CO., LTD., Yongin-si, Gyeonggi-do (KR)

(72) Inventors: Tae-Hyun Bae, Yongin-si (KR); Woo-Cheol Shin, Yongin-si (KR); Sang-Il Han, Yongin-si (KR); Jung-Yi Yu, Yongin-si (KR); Mi-Hyun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 184 days.

(21) Appl. No.: 13/736,867

(22) Filed: Jan. 8, 2013

(65) Prior Publication Data
US 2014/0065463 A1 Mar. 6, 2014

Related U.S. Application Data

(60) Provisional application No. 61/670,084, filed on Jul. 10, 2012.

(51) Int. Cl.
H01M 2/14 (2006.01)
H01M 2/16 (2006.01)
H01M 10/42 (2006.01)
H01M 10/052 (2010.01)

(52) U.S. Cl.
CPC ........ *H01M 2/1646* (2013.01); *H01M 10/4235* (2013.01); *H01M 10/052* (2013.01)

(58) Field of Classification Search
CPC ..................................................... H01M 2/1646
USPC ........................................................... 429/144
See application file for complete search history.

(56) References Cited

U.S. PATENT DOCUMENTS

| 2,302,832 | A | * | 11/1942 | Behrman | 521/64 |
| 5,418,365 | A | * | 5/1995 | Robin et al. | 250/338.2 |
| 2005/0037257 | A1 | * | 2/2005 | Akashi et al. | 429/144 |
| 2006/0063066 | A1 | * | 3/2006 | Choi et al. | 429/120 |
| 2009/0286140 | A1 | * | 11/2009 | Kim et al. | 429/62 |
| 2009/0315724 | A1 | * | 12/2009 | Kim et al. | 340/584 |
| 2010/0291430 | A1 | * | 11/2010 | Lee et al. | 429/129 |
| 2011/0216388 | A1 | * | 9/2011 | Granqvist | 359/265 |

FOREIGN PATENT DOCUMENTS

| JP | 2009146810 | 7/2009 |
| KR | 1020070033853 A | 3/2007 |
| KR | 10-0883754 | 2/2009 |

(Continued)

OTHER PUBLICATIONS

Ye et al. (Journal of Alloys and Compounds 504 (2010) 503-507).*
Manning et al. (Proceedings- Electrochemical Society PV, 777-782. 2003).*

(Continued)

*Primary Examiner* — Stewart Fraser
*Assistant Examiner* — Olatunji Godo
(74) *Attorney, Agent, or Firm* — Christie, Parker & Hale, LLP

(57) ABSTRACT

A separator for a rechargeable lithium battery including a tungsten-doped vanadium oxide ($VO_2$) phase transition material and the rechargeable lithium battery including the separator. Here, an explosion possibility of the rechargeable lithium battery including the separator may be prevented and delayed when the battery is excessively heated.

16 Claims, 6 Drawing Sheets

(56) References Cited

FOREIGN PATENT DOCUMENTS

KR 1020090098522 A 9/2009
WO WO 2010/026125 * 3/2010

OTHER PUBLICATIONS

Outkina et al. (Russian Microelectronics vol. 39, No. 4, 2010).*
By Kang et al. (ACS Appl. Mater. Interfaces 2011, 3, 135-138).*
Korean Patent Abstract No. 1020080008135A for Publication No. KR10-0883754, 1 pg.

* cited by examiner

SEPARATOR FOR RECHARGEABLE LITHIUM BATTERY AND RECHARGEABLE LITHIUM BATTERY INCLUDING THE SAME

CROSS-REFERENCE TO RELATED APPLICATION

This application claims priority to and the benefit of U.S. Provisional Application No. 61/670,084, filed on Jul. 10, 2012, in the U.S. Patent and Trademark Office, the entire content of which is incorporated herein by reference.

BACKGROUND

1. Field

The following description relates to a separator for a rechargeable lithium battery and a rechargeable lithium battery including the same.

2. Description of the Related Art

Recently, developments in the information technology (IT) industry have been very rapid as compared with other science and technology fields, and these developments have been applied to produce many kinds of portable and convenient mobile devices such as laptops, cell phones, PDAs, and the like. These IT mobile devices require a more slim-sized and lighter battery with larger capacity and the like as an energy source. For the energy source, a rechargeable lithium battery has been widely used and researched.

The rechargeable lithium battery has been widely used due to its high energy density per unit volume. However, the rechargeable lithium battery may become swollen when its internal temperature is too high and may then explode at about 150° C. This explosion possibility of the rechargeable lithium battery has been known for a long time but not resolved yet. Accordingly, there is still a need for the development of a solution to prevent and/or delay this explosion possibility.

SUMMARY

An aspect of an embodiment is directed toward a separator for a rechargeable lithium battery capable of preventing and/or delaying explosion of the rechargeable lithium battery.

An aspect of an embodiment is directed toward a rechargeable lithium battery including the separator.

According to an embodiment, a separator for a rechargeable lithium battery includes a phase transition material. The phase transition material has an insulator-to-conductor phase transition temperature of from about 67° C. to about 75° C.

In one embodiment, the phase transition material is a phase transition material of vanadium oxide ($VO_2$) doped with tungsten. The tungsten may be doped in the phase transition material to be from about 10 wt % to about 20 wt % of total weight of the phase transition material.

According to another embodiment, a rechargeable lithium battery includes: a positive electrode with a positive active material; a negative electrode with a negative active material; a separator between the positive electrode and the negative electrode; and an electrolyte impregnating the positive electrode, the negative electrode, and the separator. Here, the separator includes a phase transition material. The phase transition material has an insulator-to-conductor phase transition temperature of from about 67° C. to about 75° C.

According to another embodiment, a separator for a rechargeable lithium battery includes: a porous substrate; a first phase transition region on a first side of the porous substrate; and a second phase transition region on a second side of the porous substrate facing oppositely away from the first side. Here, the first and second phase transition regions symmetrically face each other on the first and second sides of the porous substrate, each of the first and second phase transition region including a phase transition material, and being adapted to transition to a conductor from an insulator at a temperature greater than or equal to a phase transition temperature.

In one embodiment, the pores of the porous substrate contain another phase transition material between the first and second phase transition regions.

In one embodiment, the first and second phase transition regions penetrate the porous substrate and are connected with each other to be an integrated phase transition region.

In one embodiment, the first or second phase transition region is less than or equal to about 10% of the first or second side of the porous substrate in area. The first or second phase transition region may be from about 5% to about 10% of the first or second side of the porous substrate in area.

In one embodiment, the first or second phase transition region is in the form of a coating layer on the first or second side of the porous substrate. The coating layer may have a thickness from about 5 μm to about 10 μm.

In one embodiment, the phase transition temperature is from about 67° C. to about 75° C.

In one embodiment, the phase transition material is a tungsten-doped vanadium oxide ($VO_2$). The tungsten may be doped in the tungsten-doped vanadium oxide ($VO_2$) to be from about 10 wt % to about 20 wt % of total weight of the tungsten-doped vanadium oxide ($VO_2$).

According to another embodiment, a rechargeable lithium battery includes: a positive electrode with a positive active material; a negative electrode with a negative active material; a separator between the positive electrode and the negative electrode; and an electrolyte impregnating the positive electrode, the negative electrode, and the separator. Here, the separator includes: a porous substrate; a first phase transition region on a first side of the porous substrate; and a second phase transition region on a second side of the porous substrate facing oppositely away from the first side. The first and second phase transition regions symmetrically face each other on the first and second sides of the porous substrate, each of the first and second phase transition region including a phase transition material, and being adapted to transition to a conductor from an insulator at a temperature greater than or equal to a phase transition temperature.

In one embodiment, the first phase transition region of the separator contacts the negative electrode, and the second phase transition region of the separator contacts with the positive electrode.

In one embodiment, the separator is configured and adapted to prevent or delay an explosion of the rechargeable lithium battery when the rechargeable lithium battery is excessively heated.

In one embodiment, the phase transition temperature is from about 67° C. to about 75° C.

In one embodiment, the phase transition material is a tungsten-doped vanadium oxide ($VO_2$). The tungsten may be doped in the tungsten-doped vanadium oxide ($VO_2$) to be from about 10 wt % to about 20 wt % of total weight of the tungsten-doped vanadium oxide ($VO_2$).

According to another embodiment, a separator for a rechargeable lithium battery includes a phase transition material of vanadium oxide ($VO_2$) doped with tungsten.

Here, the above described separator according to an embodiment may prevent and/or delay explosion of a rechargeable lithium battery when the rechargeable lithium battery is excessively heated.

DETAILED DESCRIPTION

Figure 1:
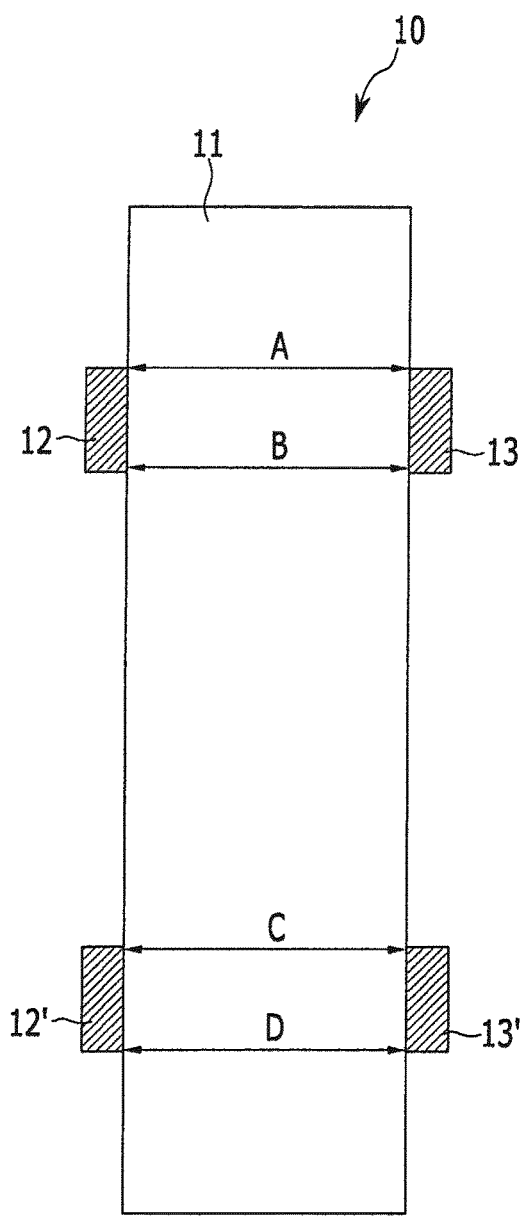
FIG. 1 is the cross-sectional view of a separator according to an embodiment.

Exemplary embodiments of this disclosure will hereinafter be described in detail. However, these embodiments are only exemplary, and this disclosure is not limited thereto.

The exemplary embodiments may be embodied in many different forms and are not to be construed as limited to the disclosed embodiments set forth herein. In the figures, size and thickness of each component may be exaggerated for easy explanation, and thus the present invention is not limited to the size and thickness shown in the figures.

In one embodiment, a separator includes a phase transition material of vanadium oxide ($VO_2$) doped with tungsten.

The phase transition material is converted from an insulator to a conductor at greater than or equal to a set or predetermined temperature (e.g., an insulator-to-conductor phase transition temperature). Here, the phase transition temperature denotes a set or predetermined temperature at which the phase transition material transits to a conductor from an insulator.

In an operation, a rechargeable lithium battery may explode during the operation, when its temperature is too high. Since the phase transition material becomes a conductor at greater than or equal to a phase transition temperature, a separator including the phase transition material may pass electricity. As a result, the separator, which is disposed between the positive and negative electrode, causes a short circuit at greater than or equal to the phase transition temperature, stops operation of the battery (that includes the separator), and prevents or at least delays explosion of the battery by stopping temperature increase of the battery.

One of the representative phase transition materials is vanadium oxide ($VO_2$) having the property of an insulator with a resistance of about $10^5 \Omega$ at less than or equal to about 67° C. but having the property of a conductor with a resistance ranging from about 10 to about $10^{-2} \Omega$ at greater than or equal to about 67° C. The vanadium oxide may be doped with tungsten (W) to adjust the phase transition temperature to be about 67° C. For example, the tungsten-doped vanadium oxide phase transition material may have a phase transition temperature ranging from about 67 to about 75° C.

The phase transition temperature may be changed by controlling the doping amount of the tungsten. For example, the phase transition material may include tungsten in an amount ranging from about 10 to about 20 wt %.

The tungsten-doped vanadium oxide phase transition material may be prepared in a method of sputtering, ion plating, e-beam deposition, and the like.

For example, the sputtering method of preparing the tungsten-doped vanadium oxide phase transition material is described in more detail. First, a single vanadium raw material or two vanadium raw materials and a tungsten raw material are irradiated by a laser in a chamber, so that tungsten (W) and vanadium (V) particles are deposited on a substrate. The substrate may be a porous substrate described in more detail later for fabricating the separator. Herein, the process should be performed under a condition of preparing a phase transition material, which prepares $VO_2$ rather than $V_2O_5$. For example, the chamber has an Ar and $O_2$ mixed gas atmosphere. Herein, a mixing ratio of Ar and $O_2$, a temperature, and a pressure are important conditions for producing $VO_2$. The chamber is set to have an atmosphere of Ar:$O_2$=99:1 to 98:2, a temperature ranging from 350 to 400° C., and a pressure ranging from 8 to 12 mTorr.

In general, a separator is formed of a porous substrate, and the phase transition material may exist in the pores of the porous substrate. The phase transition materials in the pores are connected to one another at greater than or equal to a phase transition temperature and may pass electricity through the separator.

Accordingly, the phase transition materials may be included in an amount capable of passing electricity through the separator at greater than or equal to a phase transition temperature.

According to another embodiment, provided is a separator including a porous substrate; a first phase transition region on one surface of the porous substrate; and a second phase transition region on the other surface of the porous substrate. The first and second phase transition regions symmetrically face each other on both surfaces of the porous substrate. The first and second phase transition regions include a phase transition material, which has a phase transition from an insulator to a conductor at greater than or equal to a phase transition temperature as aforementioned.

FIG. 1 is the cross-sectional view of a separator 10 according to one embodiment. The separator 10 includes a porous substrate 11 and the phase transition regions 12 and 12' on one surface of a first side of the porous substrate 11. In addition, the second phase transition regions 13 and 13' are formed on the other or second side of the porous substrate 11.

The first phase transition regions 12 and 12' and the second phase transition regions 13 and 13' symmetrically face each other on both sides of the porous substrate 11. Referring to FIG. 1, the arrows A, B, C, and D in the separator 10 respectively mark the same phase (height), and the first phase transition regions 12 and 12' and the second phase transition regions 13 and 13' have symmetrical phases.

For example, the first phase transition regions 12 and 12' and the second phase transition regions 13 and 13' may be respectively formed by coating or patterning a part of the surface of the porous substrate 11 with a phase transition material. According to one embodiment, the separator may be fabricated by covering a plate having a carved pattern for coating or patterning the phase transition material on the surface of the porous substrate where the phase transition material is supposed to be formed and then, directly depositing a tungsten (W)-doped vanadium oxide ($VO_2$) thereon in the aforementioned sputtering, ion plating, and e-beam deposition methods, and the like.

The coating layer or pattern formed from the phase transition material has a suitable thickness. For example, the first phase transition region and the second phase transition region may have a coating thickness ranging from about 5 μm to about 10 μm.

Figure 2:
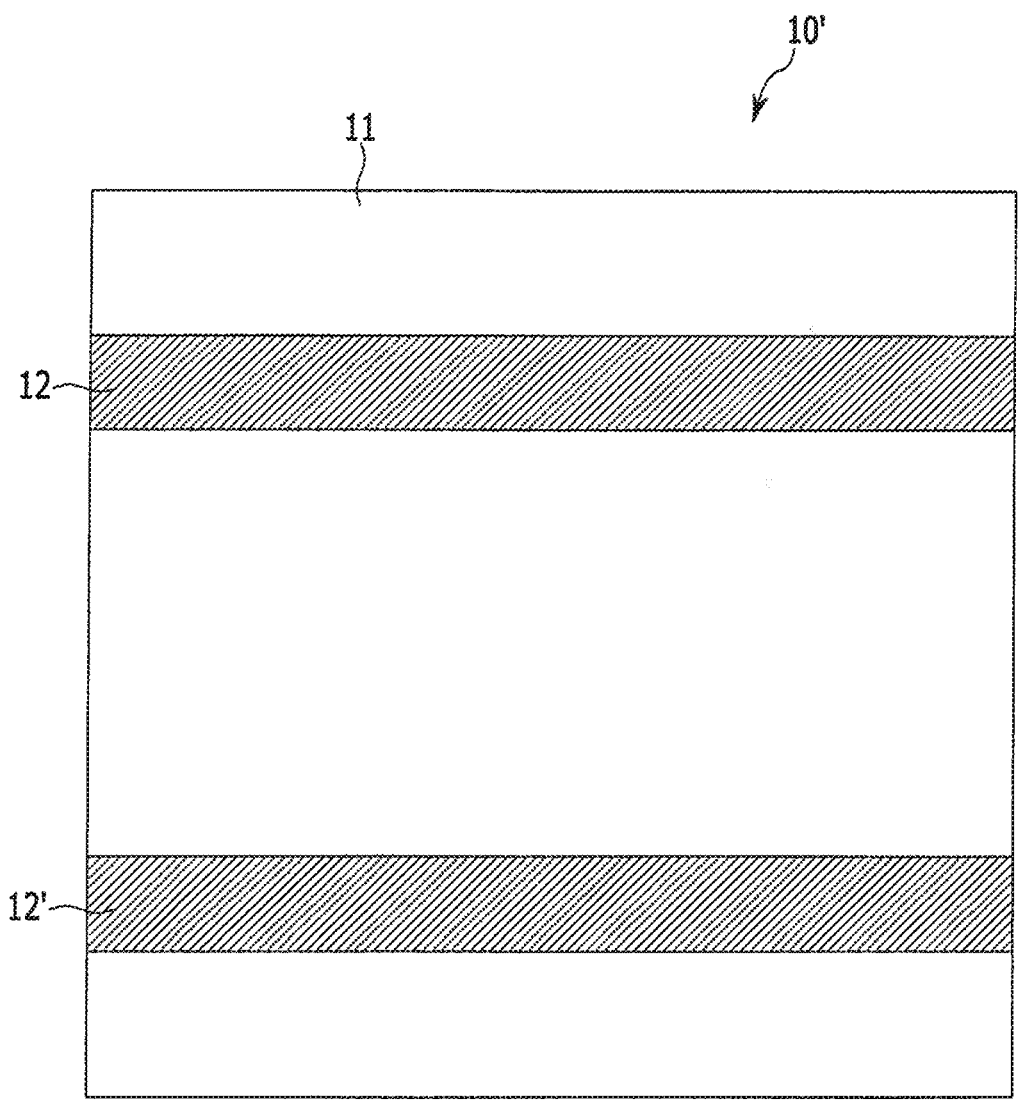
FIG. 2 shows the surface of a separator according to another embodiment.

FIG. 2 shows the surface of the separator 10' fabricated by patterning one surface of the porous substrate 11 with a phase transition material and forming the first phase transition regions 12 and 12' thereon as aforementioned. On the other side surface of the separator 10', the second phase transition regions 13 and 13' (not shown in FIG. 2) are formed to have the same phase by patterning a phase transition material. FIG. 2 shows that the phase transition region has a stripe shape by patterning the phase transition material but other suitable pattern shape may also be used.

The separators 10 and 10' are capable of causing a short circuit when a rechargeable lithium battery is excessively heated during operation, because a phase transition material included in the first phase transition regions 12 and 12' and the second phase transition regions 13 and 13' penetrate into pores of the porous substrate 11 and thereby electrically connect the first phase transition region 12 with the second phase transition region 13 and also electrically connect the first phase transition region 12' with the second phase transition region 13'.

The separators 10 and 10' include two pairs of the first phase transition regions 12 and 12' and the second phase transition regions 13 and 13' but may have just the pair of the first phase transition region 12 and the second phase transition region 13 or the pair of the first phase transition region 12' and the second phase transition region 13'. In addition, another pair of the first phase transition region and the second phase transition region may be additionally included.

Figure 3:
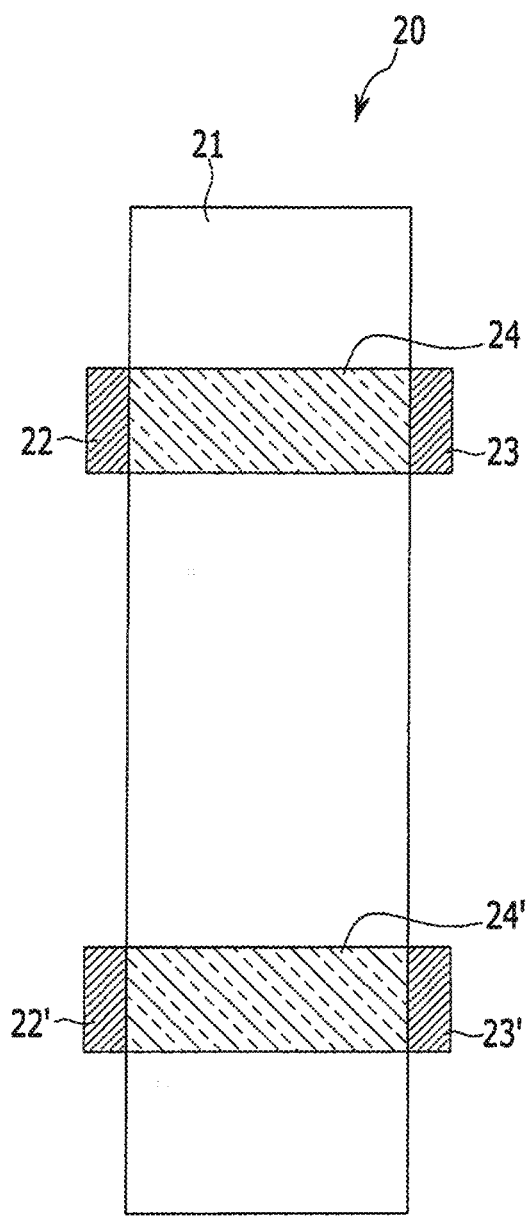
FIG. 3 is the cross-sectional view of a separator according to another embodiment.

FIG. 3 shows the cross-sectional view of a separator 20 according to another embodiment, which has porous substrate regions 24 and 24' including a phase transition material penetrated into the pores of the porous substrate 21 from the first phase transition regions 22 and 22' to the second phase transition regions 23 and 23' when a rechargeable lithium battery is excessively heated. As a non-limiting example and according to one embodiment, the phase transition material in the porous substrate regions 24 and 24' is adapted to only penetrate the porous substrate to electrically connect the first and second phase transition regions 22 and 22' and 23 and 23' at a temperature greater than or equal to the phase transition temperature.

Figure 4:
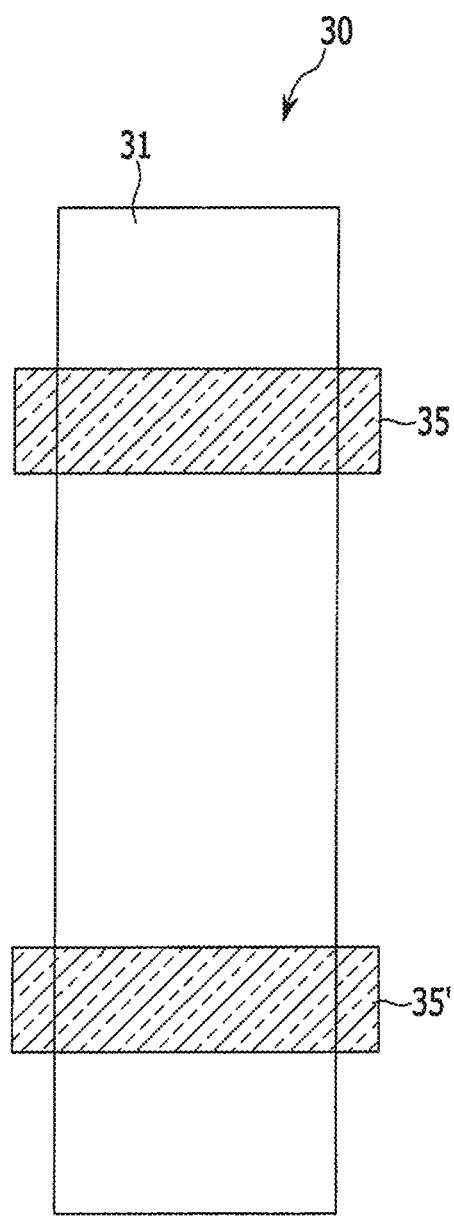
FIG. 4 is the cross-sectional view of a separator according to yet another embodiment.

FIG. 4 shows the cross-sectional view of a separator 30 according to still another embodiment. The separator 30 includes phase transition regions 35 and 35' formed by the first and second phase transition regions penetrating the porous substrate 31 and integrally connected to each other.

The first or second phase transition region has an area big enough to pass electricity through at greater than or equal to a phase transition temperature but not too big to hinder operation of the separator as a Li ion passage. For example, the first or second phase transition region may have an area ranging from greater than 0% to equal or less than about 10% of one surface area of a side of the porous substrate and specifically, from about 5% to about 10%. In one embodiment, the first or second phase transition region is less or equal to about 10% of the first or second side of the porous substrate in area. In one embodiment, the first or second phase transition region is from about 5% to about 10% of the first or second side of the porous substrate in area.

Hereinafter, the phase transition material is described in more detail as aforementioned.

In another embodiment, a rechargeable lithium battery includes a positive electrode including a positive active material, a negative electrode including a negative active material and the separator described above.

The rechargeable lithium battery may be classified into lithium ion batteries, lithium ion polymer batteries, and lithium polymer batteries according to the presence of a separator and the kind of electrolyte used in the battery. The rechargeable lithium batteries may have a variety of shapes and sizes and thus, may be cylindrical, prismatic, or coin-shaped batteries and also, may be thin film batteries or be rather bulky batteries in size. Structures and fabrication methods of the rechargeable lithium battery are known in the art. In one embodiment, the separator has an improved binding force due to a coating layer including a binder polymer and particularly, may be more stably bound with an electrode in a pouch-type battery fabricated by using a soft packing material such as a laminate film and the like and thus, has no gap due to detachment from the electrode and is well fixed with the electrode.

Figure 5:
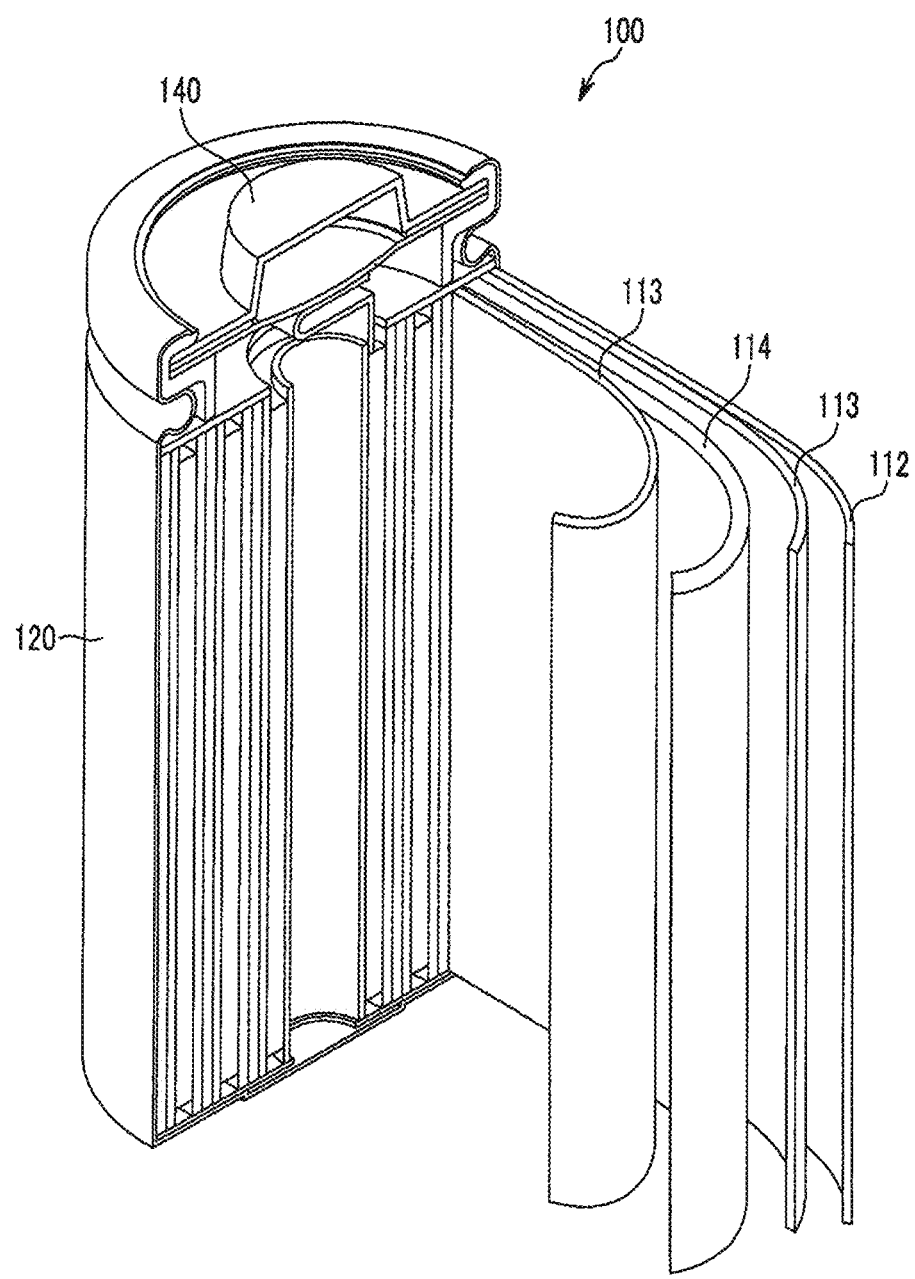
FIG. 5 shows the structure of a rechargeable lithium battery according to an embodiment.

FIG. 5 is an exploded perspective view showing a rechargeable lithium battery 100 in accordance with an embodiment. Referring to FIG. 5, the rechargeable lithium battery 100 is a cylindrical battery that includes a negative electrode 112, a positive electrode 114, a separator 113 disposed between the positive electrode 114 and the negative electrode 112, an electrolyte (that is impregnated in the negative electrode 112, the positive electrode 114, and the separator 113), a battery case 120, and a sealing member 140 sealing the battery case 120. In one embodiment, the rechargeable lithium battery 100 is fabricated by sequentially stacking the negative electrode 112, the positive electrode 114, and the separator 113, and spiral-winding them and housing the wound product in the battery case 120.

The negative electrode includes a current collector and a negative active material layer formed on the current collector, and the negative active material layer includes a negative active material.

The negative active material includes a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions includes carbon materials. The carbon material may be any generally-used carbon-based negative active material in a lithium ion rechargeable battery. Examples of the carbon material include crystalline carbon, amorphous carbon, and a combination thereof. The crystalline carbon may be non-shaped, or sheet, flake, spherical, or fiber shaped natural graphite or artificial graphite. The amorphous carbon may be a soft carbon (carbon obtained by sintering at a low temperature), a hard carbon, a mesophase pitch carbonized product, fired coke, or the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, or Sn.

Examples of the material being capable of doping and dedoping lithium include Si, $SiO_x$ (0<x<2), a Si—C composite, a Si-Q alloy (wherein Q is an element selected from the group consisting of an alkali metal, an alkaline-earth metal, Group 13 to 16 elements, a transition element, a rare earth element, and a combination thereof, and not Si), Sn, $SnO_2$, a Sn—C composite, a Sn—R alloy (wherein R is an element selected from the group consisting of an alkali metal, an alkaline-earth metal, Group 13 to 16 elements, a transition element, a rare earth element, and combinations thereof and is not Sn), and the like. The Q and R may be an element of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the transition metal oxide include vanadium oxide, lithium vanadium oxide, and the like.

The negative active material layer may include a binder and optionally a conductive material.

The binder improves binding properties of the negative active material particles to one another and to the current collector. Examples of the binder include polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of a negative electrode. Any electrically conductive material can be used as a conductive agent, unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; and a mixture thereof.

The current collector may be a copper foil, a nickel foil, a stainless steel foil, a titanium foil, a nickel foam, a copper foam, a polymer substrate coated with a conductive metal, or combinations thereof.

The positive electrode includes a current collector and a positive active material layer disposed on the current collector.

The positive active material includes lithiated intercalation compounds that reversibly intercalate and deintercalate lithium ions. The positive active material may include a composite oxide including at least one selected from the group consisting of cobalt, manganese, and nickel, as well as lithium. In particular, the following lithium-containing compounds may be used:

$Li_aA_{1-b}R_bD_2$ (wherein, in the above formula, $0.90 \leq a \leq 1.8$ and $0 \leq b \leq 0.5$); $Li_aE_{1-b}R_bO_{2-c}D_c$ (wherein, in the above formula, $0.90 \leq a \leq 1.8$, $0 \leq b \leq 0.5$ and $0 \leq c \leq 0.05$); $LiE_{2-b}R_bO_{4-c}D_c$ (wherein, in the above formula, $0 \leq b \leq 0.5$, $0 \leq c \leq 0.05$); $Li_aNi_{1-b-c}Co_bR_cD_\alpha$ (wherein, in the above formula, $0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ (wherein, in the above formula, $0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ (wherein, in the above formula, $0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ (wherein, in the above formula, $0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ (wherein, in the above formula, $0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ (wherein, in the above formula, $0.90 \leq a \leq 1.8$, $0 \leq b \leq 0.5$, $0 \leq c \leq 0.05$ and $0 < \alpha < 2$); $Li_aNi_bE_cG_dO_2$ (wherein, in the above formula, $0.90 \leq a \leq 1.8$, $0 \leq b \leq 0.9$, $0 \leq c \leq 0.5$ and $0.001 \leq d \leq 0.1$); $Li_aNi_bCo_cMn_dGeO_2$ (wherein, in the above formula, $0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ (wherein, in the above formula, $0.90 \leq a \leq 1.8$ and $0.001 \leq b \leq 0.1$); $Li_aCoG_bO_2$ (wherein, in the above formula, $0.90 \leq a \leq 1.8$ and $0.001 \leq b \leq 0.1$); $Li_aMnG_bO_2$ (wherein, in the above formula, $0.90 \leq a \leq 1.8$ and $0.001 \leq b \leq 0.1$); $Li_aMn_2G_bO_4$ (wherein, in the above formula, $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The compound may have a coating layer on the surface or be mixed with a compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compounds for a coating layer can be amorphous or crystalline. The coating element for a coating layer may include Mg, Al, Co, K, Na, Ca, Si, Ti, V, Sn, Ge, Ga, B, As, Zr, or a mixture thereof. The coating layer can be formed in a method having no negative influence on properties of a positive active material by including these elements in the compound. For example, the method may include any coating method such as spray coating, dipping, and the like but is not illustrated in more detail, since it is well-known to those who work in the related field.

The positive active material layer may include a binder and a conductive material.

The binder improves binding properties of the positive active material particles to one another and to a current collector. Examples of the binder may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of a negative electrode. Any electrically conductive material may be used as a conductive agent, unless it causes a chemical change. For example, it may include natural graphite, artificial graphite, carbon black, acetylene black, ketjen black, carbon fiber, metal powder, metal fiber or the like such as copper, nickel, aluminum, silver or the like, or one or at least one kind of mixture of conductive material such as polyphenylene derivative or the like.

The current collector may be Al but is not limited thereto.

The negative and positive electrodes may be fabricated in a method of mixing the active material, a conductive material, and a binder with an active material composition and coating the composition on a current collector, respectively. The electrode-manufacturing method is well known and thus, is not described in detail in the present specification. The solvent may include N-methylpyrrolidone and the like, but is not limited thereto.

The electrolyte includes a non-aqueous organic solvent and a lithium salt.

The non-aqueous organic solvent serves as a medium of transmitting ions taking part in the electrochemical reaction of a battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or the like, and examples of the ester-based solvent may include methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone, or the like. Examples of the alcohol-based solvent include ethyl alcohol, isopropyl alcohol, and the like, and examples of the aprotic solvent include nitriles such as R—CN (wherein R is a C2 to C20 linear, branched, or cyclic hydrocarbon group including a double bond, an aromatic ring, or an ether bond), amides such as dimethylformamide, dioxolanes such as 1,3-dioxolane, sulfolanes, or the like.

The non-aqueous organic solvent may be used singularly or in a mixture. When the organic solvent is used in a mixture, the mixture ratio may be controlled in accordance with a desirable battery performance, which may be understood by the person skilled in the related art.

The carbonate-based solvent is prepared by mixing a cyclic carbonate and a linear carbonate. The cyclic carbonate and the linear carbonate are mixed together in the volume ratio of about 1:1 to about 1:9. Within this range, performance of electrolyte may be improved.

The non-aqueous organic electrolyte may be further prepared by mixing a carbonate-based solvent with an aromatic hydrocarbon-based solvent. The carbonate-based and the aromatic hydrocarbon-based solvents may be mixed together in a volume ratio ranging from about 1:1 to about 30:1.

The aromatic hydrocarbon-based organic solvent may be represented by the following Chemical Formula 1.

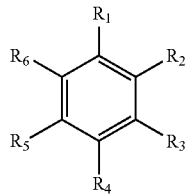

[Chemical Formula 1]

In Chemical Formula 1, $R_1$ to $R_6$ are each independently hydrogen, halogen, a $C_1$ to $C_{10}$ alkyl group, a $C_1$ to $C_{10}$ haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate, an ethylene carbonate-based compound represented by the following Chemical Formula 2, or a combination thereof to improve cycle-life.

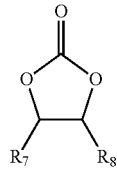

[Chemical Formula 2]

In Chemical Formula 2, $R_7$ and $R_8$ are independently selected from hydrogen, halogen, a cyano group (CN), a nitro group ($NO_2$), and a C1 to C5 fluoroalkyl group, provided that at least one of $R_7$ and $R_8$ is selected from halogen, a cyano group (CN), a nitro group ($NO_2$), and a C1 to C5 fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The vinylene carbonate or the ethylene carbonate-based compound may be controlled and/or adjusted in its amount to be within an appropriate range to improve cycle life.

The lithium salt is dissolved in an organic solvent, supplies a battery with lithium ions, operates a basic operation of the rechargeable lithium battery, and improves lithium ion transportation between positive and negative electrodes therein. Examples of the lithium salt include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, $LiB(C_2O_4)_2$ (lithium bis(oxalato) borate, LiBOB), or a combination thereof, as a supporting electrolytic salt. The lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

The separator 113 separates a negative electrode 112 from a positive electrode 114 and provides a transporting passage for lithium ions, which is the same as described above.

Figure 6:
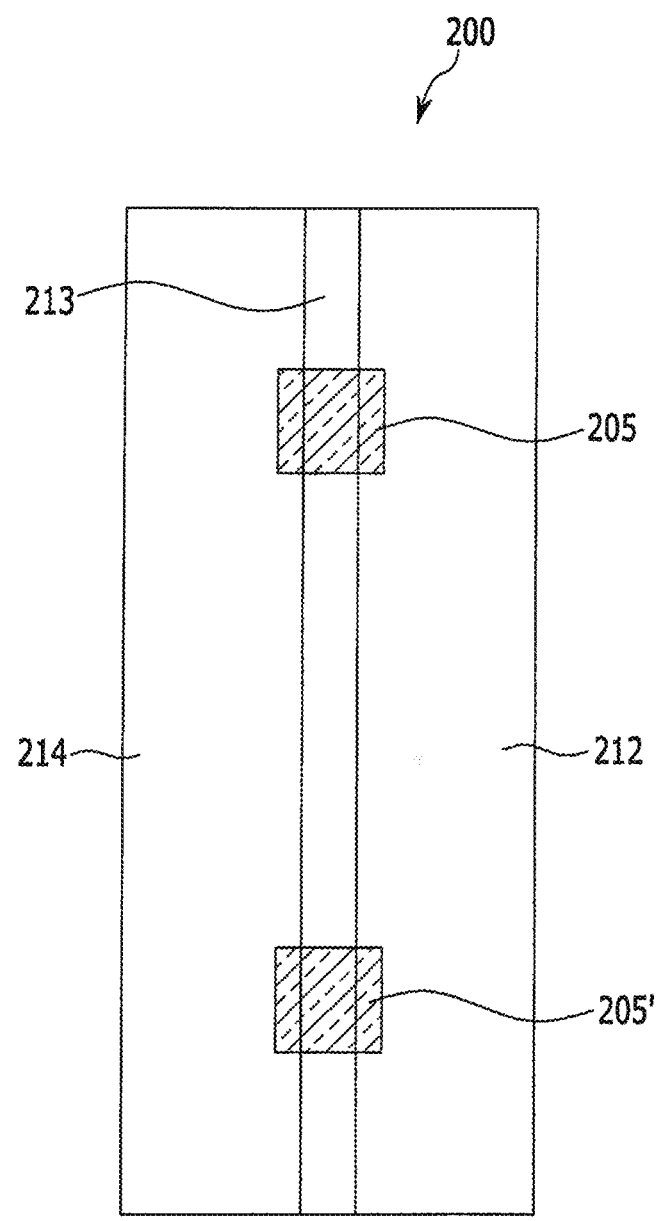
FIG. 6 shows the cross-section of a rechargeable lithium battery according to another embodiment schematically.

FIG. 6 shows a cross-section of a rechargeable lithium battery 200 including the separator 113 according to another embodiment schematically.

The rechargeable lithium battery 200 includes phase transition regions 205 and 205' formed by the first and second phase transition regions connected to each other, so that the first phase transition region contacts with the negative electrode 212, and the second phase transition region contacts with the positive electrode 214.

The following examples illustrate the present invention in more detail. These examples, however, should not in any sense be interpreted as limiting the scope of the present invention.

Examples 1 and 2

Separators were fabricated by depositing vanadium oxide doped with tungsten as a phase transition material to form a stripe pattern as shown in FIG. 2 in a sputtering method (used equipment: Excimer laser, laser type: KrF 248 nm).

The deposition was performed under the following conditions.

Laser intensity: 4 J/cm$^2$
Repetition rate: 8 Hz
Distance between source and substrate: 8.5 cm
Atmosphere volume ratio in a chamber between Ar:O$_2$=99:1 (Example 1)/Ar:O$_2$=98:2 (Example 2)
Deposition pressure: 10 mTorr
Substrate temperature: 400° C.
Deposition time: 12.5 min In view of the foregoing, a separator for a rechargeable battery according to an embodiment is capable of preventing or delaying an explosion of the rechargeable lithium battery when the rechargeable lithium battery is excessively heated.

In one embodiment, the separator includes a phase transition material of vanadium oxide (VO$_2$) doped with tungsten that has an insulator-to-conductor phase transition temperature of from about 67° C. to about 75° C. As such, the separator can be transitioned into a conductor to prevent or delay the explosion of the rechargeable lithium battery when the rechargeable lithium battery is excessively heated.

Here, the separator may include a porous substrate; a first phase transition region on a first side of the porous substrate; and a second phase transition region on a second side of the porous substrate facing oppositely away from the first side. The first and second phase transition regions may symmetrically face each other on the first and second sides of the porous substrate and include the above described phase transition material so that the first and second phase transition region can transit to a conductor from an insulator at greater than or equal to the phase transition temperature to prevent or delay the explosion of the rechargeable lithium battery when the rechargeable lithium battery is excessively heated.

Description Of Symbols 10, 10', 20, 30: separator
11, 21, 31: porous substrate
12, 12', 22, 22': first phase transition region
13, 13', 23, 23': second phase transition region
24, 24': porous substrate region including a phase transition material in its pore
35, 35': phase transition region
100, 200: rechargeable lithium battery
112, 212: negative electrode
113, 213: separator
114, 214: positive electrode
120: battery case
140: sealing member
205, 205': phase transition region While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A separator for a rechargeable lithium battery, the separator comprising: a porous substrate; and a phase transition region formed of a phase transition material directly on the porous substrate, wherein the phase transition material has an insulator-to-conductor phase transition temperature of from about 67° C. to about 75° C., and the phase transition region is less than or equal to about 10% of the porous substrate in area, and wherein the phase transition material is a phase transition material of vanadium oxide (VO$_2$) doped with tungsten.

2. The separator of claim 1, wherein tungsten is doped in the phase transition material to be from about 10 wt% to about 20 wt% of total weight of the phase transition material.

3. A rechargeable lithium battery comprising:
a positive electrode comprising a positive active material;
a negative electrode comprising a negative active material;
the separator of claim 1 between the positive electrode and the negative electrode; and
an electrolyte impregnating the positive electrode, the negative electrode, and the separator.

4. A separator for a rechargeable lithium battery comprising: a porous substrate; a first phase transition region directly on a first side of the porous substrate; and a second phase transition region directly on a second side of the porous substrate facing oppositely away from the first side in a thickness direction of the porous substrate, wherein the first and second phase transition regions symmetrically face each other on the first and second sides of the porous substrate, each of the first and second phase transition regions comprising a phase transition material and being adapted to transition to a conductor from an insulator at a temperature greater than or equal to a phase transition temperature, and the first or second phase transition region is less than or equal to about 10% of the first or second side of the porous substrate in area, and wherein the phase transition material is a tungsten-doped vanadium oxide (VO$_2$).

5. The separator of claim 4, wherein the pores of the porous substrate contain another phase transition material between the first and second phase transition regions.

6. The separator of claim 4, wherein the first and second phase transition regions penetrate the porous substrate and are connected with each other to be an integrated phase transition region.

7. The separator of claim 4, wherein the first or second phase transition region is from about 5% to about 10% of the first or second side of the porous substrate in area.

8. The separator of claim 4, wherein the first or second phase transition region is in the form of a coating layer on the first or second side of the porous substrate.

9. The separator of claim 8, wherein the coating layer has a thickness from about 5 μm to about 10 μm.

10. The separator of claim 4, wherein the phase transition temperature is from about 67° C. to about 75° C.

11. The separator of claim 4, wherein the tungsten is doped in the tungsten-doped vanadium oxide (VO$_2$) to be from about 10 wt% to about 20 wt% of total weight of the tungsten-doped vanadium oxide (VO$_2$).

12. A rechargeable lithium battery comprising:
a positive electrode comprising a positive active material;
a negative electrode comprising a negative active material;
the separator of claim 5 between the positive electrode and the negative electrode; and
an electrolyte impregnating the positive electrode, the negative electrode, and the separator.

13. The rechargeable lithium battery of claim 12, wherein the first phase transition region of the separator contacts the negative electrode, and the second phase transition region of the separator contacts with the positive electrode.

14. The rechargeable lithium battery of claim 12, wherein the separator is configured and adapted to prevent or delay an explosion of the rechargeable lithium battery when the rechargeable lithium battery is excessively heated.

15. The rechargeable lithium battery of claim 12, wherein the phase transition temperature is from about 67° C. to about 75° C.

16. The rechargeable lithium battery of claim 12, wherein the tungsten is doped in the tungsten-doped vanadium oxide ($VO_2$) to be from about 10 wt% to about 20 wt% of total weight of the tungsten-doped vanadium oxide ($VO_2$).

* * * * *